Patented Aug. 14, 1934

1,970,374

UNITED STATES PATENT OFFICE 1,970,374

α-METHYLOL-α-ETHYL-BUTYRALDEHYDE AND PROCESS OF PREPARING SAME

Paul Halbig, Felix Kaufler, and Hans Deger, Munich, Germany, assignors to Dr. Alexander Wacker Gesellschaft fur Elektrochemische Industrie G. m. b. H., Munich, Germany, a corporation No Drawing. Application March 31, 1933, Serial No. 663,851. In Germany April 13, 1932

9 Claims. (Cl. 260—141)

This invention relates to α-methylol-α-ethyl-butyraldehyde and process of preparing same.

We have discovered that α-methylol-α-ethyl-butyraldehyde may be prepared by subjecting 3-formyl-n-pentane and formaldehyde to aldol condensation in the presence of aldol condensation catalysts such as an aqueous solution of sodium hydroxide, potassium hydroxide, potassium carbonate, dilute hydrochloric acid, etc. The reaction product, α-methylol-α-ethyl-butyraldehyde, is recovered by distillation.

Best results are obtained by using a solution-promoting-liquid, such as methanol, to facilitate forming a solution of formaldehyde and 3-formyl-n-pentane, and also using an excess of 3-formyl-n-pentane. If equal molecular portions of 3-formyl-n-pentane and formaldehyde are used, 64% of the formaldehyde will be converted, and if 2 mols. of 3-formyl-n-pentane and one mol. of formaldehyde are used, 94% of the formaldehyde will be converted. To insure a uniform course of the reaction, it is advisable to maintain the temperature within certain limits, which varies with the different aldol condensation catalysts; with aqueous caustic alkali solutions, a temperature of 8 to 12° C. is most favorable.

Example 54 parts by weight of 28.5% aqueous formaldehyde solution and 13 parts by weight of a 24% aqueous potassium hydroxide solution are gradually poured with constant stirring into 100 parts by weight of 3-formyl-n-pentane dissolved in 140 parts by weight of methanol, preferably at 8° to 12° C. After the reaction is complete, the solution is acidified, and α-methylol-α-ethyl-butyraldehyde is obtained by fractional distillation. 94% of the formaldehyde is converted to α-methylol-α-ethyl-butyraldehyde.

The pure product is a colorless liquid having a boiling point of 96° C., under a pressure of 14 millimeters and is not miscible with water, but is soluble in alcohol. It has the formula:

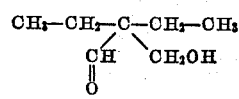

as shown by the following analysis:

Calculated: C=64.61%; H=10.78%; O=24.61%

Found:      C=64.81%; H=10.85%; O=24.34%

Upon prolonged standing, it polymerizes and crystallizes.

The compound of this invention serves as valuable starting material for chemical syntheses and particularly for the production of medicines.

The invention claimed is:

1. Process comprising subjecting formaldehyde and 3-formyl-n-pentane to aldol condensation, and recovering α-methylol-α-ethyl-butyraldehyde.

2. Process comprising subjecting formaldehyde and an excess of 3-formyl-n-pentane to aldol condensation, and recovering α-methylol-α-ethyl-butyraldehyde.

3. Process comprising subjecting formaldehyde and 3-formyl-n-pentane dissolved in a solution-promoting-liquid to aldol condensation, and recovering α-methylol-α-ethyl-butyraldehyde.

4. Process comprising subjecting formaldehyde and 3-formyl-n-pentane dissolved in methanol to aldol condensation, and recovering α-methylol-α-ethyl-butyraldehyde.

5. Process comprising subjecting formaldehyde and an excess of 3-formyl-n-pentane dissolved in methanol to aldol condensation, and recovering α-methylol-α-ethyl-butyraldehyde.

6. Process comprising subjecting formaldehyde and 3-formyl-n-pentane to aldol condensation at between 8 and 12° C., and recovering α-methylol-α-ethyl-butyraldehyde.

7. Process comprising subjecting formaldehyde and an excess of 3-formyl-n-pentane dissolved in a solution-promoting-liquid to aldol condensation in the presence of an aqueous caustic alkali solution at between 8 and 12° C., and recovering α-methylol-α-ethyl-butyraldehyde.

8. Process comprising subjecting formaldehyde and an excess of 3-formyl-n-pentane dissolved in methanol to aldol condensation in the presence of an aqueous caustic alkali solution at between 8 and 12° C., and recovering α-methylol-α-ethyl-butyraldehyde.

9. α-methylol-α-ethyl-butyraldehyde.

PAUL HALBIG.
FELIX KAUFLER.
HANS DEGER.